Figures 1, 2:
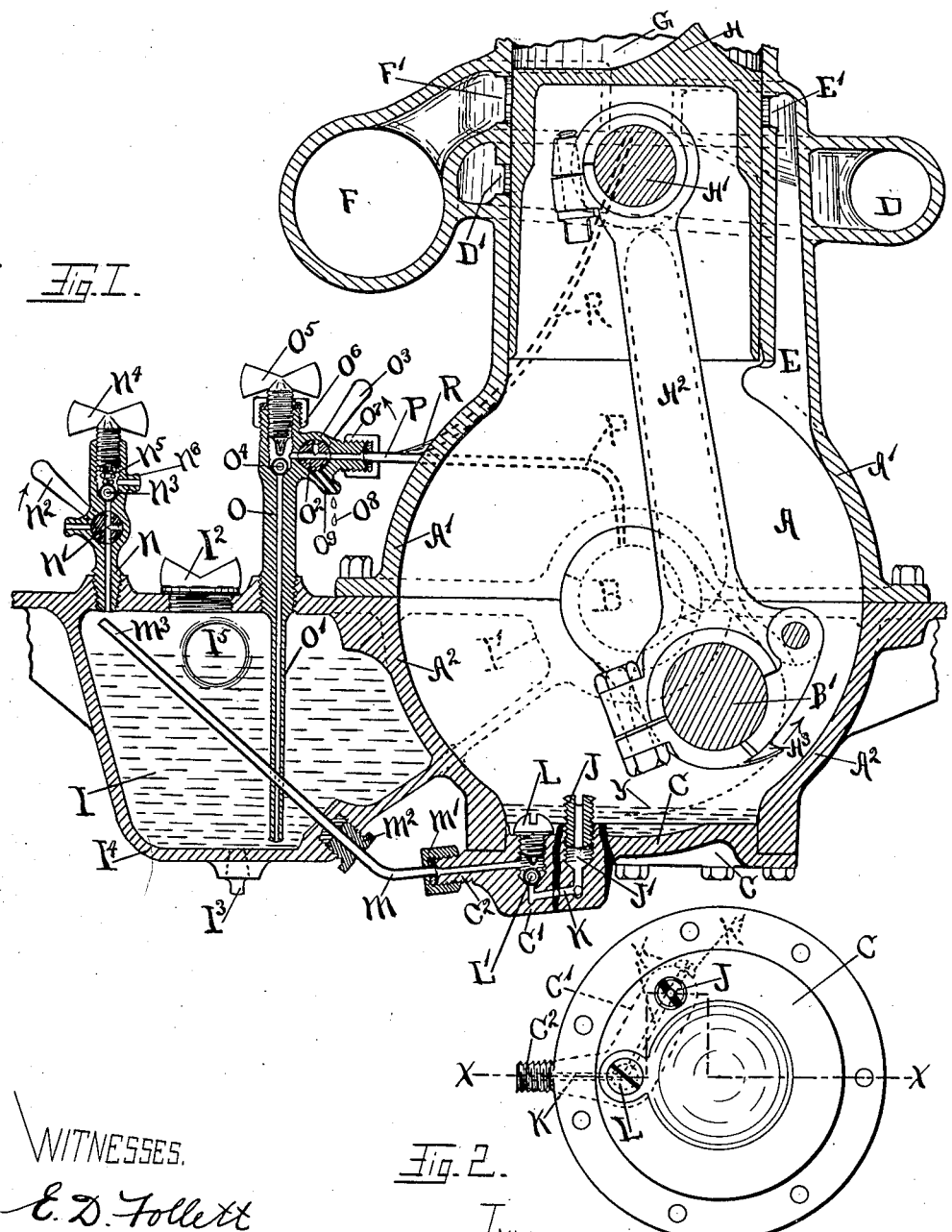

K. G. JOHNSTON.
MOTOR OILING SYSTEM.
APPLICATION FILED MAR. 5, 1908.

904,132.

Patented Nov. 17, 1908.

WITNESSES.
E. D. Follett
M. Walsh

INVENTOR
Kirk G. Johnston.

UNITED STATES PATENT OFFICE.

KIRK G. JOHNSTON, OF NEW YORK, N. Y.

MOTOR-OILING SYSTEM.

No. 904,132.  Specification of Letters Patent.  Patented Nov. 17, 1908.

Application filed March 5, 1908. Serial No. 419,357.

*To all whom it may concern:*

Be it known that I, KIRK G. JOHNSTON, a citizen of the United States, residing at No. 61 East Twenty-fifth street, in the city of New York, county of New York, and State of New York, have invented a new and useful Motor-Oiling System, of which the following is a specification.

This invention relates to improvements in the system of conducting or forcing lubricating oil to the friction producing surfaces and bearings of an engine and the objects of this invention are, first to provide a device whereby an even adjustable quantity of lubricating oil may be automatically supplied to each of the several friction surfaces and bearings of the engine whenever same is in operation; second, to provide a device in which the quantity of lubricating oil fed to each friction surface or bearing may be easily and quickly regulated and adjusted, third, to provide a device in which the general feeding of lubricating oil to all friction surfaces and bearings may be regulated without disturbing the adjustment of each separate oil feed, fourth, to provide an oiling system that will maintain at all times any desired lubricating oil level in the crank case of the engine and fifth to provide a device or system that will permit the use of a large quantity of lubricating oil on all friction surfaces and bearings without the extreme disadvantage of a large accumulation of said oil in the crank case of the motor.

These objects are attained in the mechanism illustrated in the accompanying drawing which is made part of this specification and in which Figure 1, is a sectional view of the lower part of an internal combustion engine (two cycle) with this device attached; and Fig. 2, is a top view of a crank-case-plate of the engine in which part of the device is formed in this instance.

Similar reference characters refer to similar parts throughout the drawing.

Figure 1, shows part of a socalled two-cycle internal-combustion motor for which type this oiling system is primarily devised although it is obvious that it may be adapted to any reciprocatory type of motor. Fig. 2 shows a top view of the crank-case baseplate, in which parts of the oiling device may be formed.

In Fig. 1, A is the crank-case of the engine $A^1$ and $A^2$ being the walls thereof and the said crank case is constructed and assembled in such manner that it is practically air tight.

B is the crank shaft and $B^1$ the connecting-rod wrist-pin; G is the cylinder, H the piston, $H^1$ the piston-pin upon which the upper end of the connecting-rod $H^2$ is journaled. D is the admission pipe. $D^1$ the admission port, E the passage to the cylinder from the crank case, $E^1$ the cylinder admission port, $F^1$ the exhaust port and F the exhaust pipe or chamber.

The operation of the engine is as follows:—The up stroke of the piston produces a partial vacuum in the crank-case which is relieved by the combustible mixture in the supply pipe D entering through the port $D^1$ as said port is uncovered by the piston when near its extreme outward position; the charge thus drawn within the crank-case A is compressed by the inward motion of the piston H and then expands into the cylinder G as the port $E^1$ is uncovered by the piston H near its extreme inward position;—this charge is compressed in the cylinder G, ignited and exhausted through the port $F^1$ and the operation repeats itself. It is necessary, both on account of maintaining the air-tightness of the crank-case and the high speed of the moving parts, that this type of motor has adequate lubrication and it is desirable that the quantity of lubricant be in excess of, rather than less than the absolute necessity.

In ordinary practice an excess of lubricating oil accumulates in the crank-case of the motor and, being agitated by the movement of the crank or by the dipper $H^3$ on the connecting-rod cap, is driven with the combustible charge into the cylinder G where it is burned when the charge is ignited and causes deposits to be formed on the cylinder walls and piston head which are very detrimental to the perfect operation of the engine. The burning of said lubricant also causes an obnoxious smoky exhaust, much lubricating oil is wasted and the exhaust port F is clogged.

This invention consists of the adjustable stand pipe J which may be raised or lowered on a thread in the well $J^1$ which is connected by a passage K with the check valve $L^1$ closed at the top by the screw L: Beyond the said check valve $L^1$ the passage for the excess oil continues through the pipe M, held by the packing box or union $M^1$ and packing box $M^2$, to a point designated $M^3$ near the top of the air-tight lubricating-oil tank I which is here shown as cast integral with the engine base and is provided with an air-tight filling plug $I^2$ and an air-tight draining plug $I^3$. If the oil tank I extends along several cylinders it had best be partitioned with an aperture $I^5$ near the top of each partition to the end that the oil will not all run to one end of the tank should the engine be inclined in either direction:—$I^4$ merely indicates the oil-tank wall and the dotted $I^1$ the extent of the oil-tank as here shown:—It is obvious that the oil-tank need not be an integral part of the engine base but may be a separate part and placed at any convenient point. It is also obvious that by predetermination of the proper oil level the stand pipe J may be fixed thus avoiding the necessity of adjustability. Into the said oil-tank are hermetically fitted a number of adjustable check-valves O to $O^9$.—The lower portion thereof $O^1$ reaching to near the bottom of the said oil-tank and the upper parts thereof being the adjustable check valve $O^4$, $O^5$, $O^6$ and the two-way stop-cock $O^2$—$O^3$. When the handle $O^3$ of the said stop cock is turned in the direction of the arrow the oil will drop ($O^8$) from the nozzle $O^9$ and the quantity of oil to be fed to each bearing or surface may be regulated to suit its requirements by the manipulation of the wing-screw $O^5$.—Connected to each of the said check valves by a packing box or union $O^7$ is an oil conducting pipe P or R which may be led to the desired surface or bearing.—As shown the pipe P conducts oil to one of the main crank-shaft bearings and the pipe R conducts oil to one of the cylinders. It is obvious that, if desired, an inclosed sight-feed of ordinary construction may be arranged to operate in connection with this oiling system without interfering with the spirit or letter of this invention.

Hermetically inserted into the top of the oil-tank is an adjustable spring valve N to $N^6$ provided with a two-way stop-cock $N^1$—$N^2$ which, when turned in the direction of the arrow releases at once all the air pressure normally in the oil-tank when the motor is in action. The valve $N^3$ may be adjusted by the wing-screw $N^4$ on the spring $N^5$ to lower the air pressure in the oil-tank to a desired point by permitting a constant air leak through the nozzle $N^6$ or it may be tightly closed.

The base-plate C, as shown in Fig. 1, is cut on the broken line X—X of Fig. 2 and carries a boss $C^1$ in which the stand-pipe well $J^1$, the passage K, the check valve $L^1$ and the threaded boss $C^2$ are formed. Fig. 2 is a top view of the base-plate C and shows the adjustable stand pipe J at one side and out of the way of the connecting-rod dipper $H^3$. It is obvious that the stand pipe J, the well $J^1$, and the check valve $L^1$ need not of necessity be formed in or be a part of the base-plate C but may be separately formed and attached to the base of the engine or to the said base-plate. It is also obvious that in the case of multi-cylinder motors a stand-pipe J and a check valve $L^1$ will be required in the crank-case of each cylinder.

In operation the oil tank I is filled, the filling plug $I^2$ firmly screwed down and a small quantity of oil put in the crank case A. The motor is started and the successive compressions in the crank case drive out the oil therein to the level (Y) to which the stand pipe J has been adjusted and also produce a constant air pressure in the oil tank I, nearly equal to the highest pressure obtained in the crank case A, and which is held in the said oil tank by the check-valve $L^1$; the stop-cock $O^2$ is turned to open the nozzle $O^9$ and the quantity of oil desired for each friction surface, bearing or other point regulated by the manipulation of the wing-screw $O^5$ and the stop-cock is turned to feed into the oil conductor P or R after which the oil is regularly fed to the point desired while the motor remains in action, all back pressure being held by the check valve $O^4$. When the motor is stopped the stop-cock $N^1$ may, if desired, be turned to release entirely the air-pressure in the oil-tank thus stopping all flow of oil. The spring check valve $N^3$ is normally tightly closed but, if necessitated by the use of lighter oil or high temperature, it may be slightly opened permitting a lowering of the oil-tank pressure and thus generally diminishing the oil fed to all parts. It is understood that the connections throughout this oiling system are to be made tight and maintained in that condition.

Although the accompanying drawing embodies the preferred form of this invention it is obvious that the details of the several parts may be changed or adapted to other requirements without departing from the spirit or letter of this invention.

As I am aware that systems for oiling that use air pressure, obtained from the crank-case or from the cylinders, to feed the oil are now in use I do not claim such principle broadly but Having described my invention I claim as new, novel and useful and desire to secure by Letters Patent:—

1. In a motor oiling system the combination with the crank case thereof and using the force of the successive compressions therein, of an adjustable oil-level maintaining stand pipe connected to an air-tight oil-tank, a check valve in said connection the said air-tight oil-tank, adjustable check-valves hermetically attached to and adapted to receive oil from the said air-tight oil-tank and means of conveying oil from said adjustable check valves to the required points on the motor, substantially as and for the purpose set forth.

2. In a motor oiling system as described and shown the combination with the air-tight oil-tank thereof of an adjustable auxiliary valve hermetically attached to the said oil-tank and adapted to release, either gradually or precipitantly, the pressure therein, substantially as and for the purpose set forth.

3. In a motor oiling system the combination with the motor-crank-case and using force of the successive compressions therein of means of maintaining a predetermined oil level in said crank case, means of conducting the excess oil and the compression from the said crank case into an air-tight oil-tank, the said air-tight oil-tank and means of conducting oil from said tank to the desired points on the motor, substantially as and for the purpose set forth.

4. In a motor oiling system the combination with the motor-crank-case and using the force of the successive compressions therein of an adjustable stand pipe adapted to maintain a predetermined oil level in said crank case, a passage connecting with said adjustable stand pipe and adapted to convey the force of said successive compressions and the excess oil into an air-tight oil-tank, a check valve in said passage, the said air-tight oil-tank and means of conducting oil from the said tank to the desired points on the motor, substantially as and for the purpose set forth.

5. In a motor oiling system the combination with the motor-crank-case and using the force of the successive compressions therein of an adjustable stand pipe adapted to maintain a predetermined oil level in said crank case, a passage connecting with said adjustable stand pipe and adapted to convey the force of said successive compressions and the excess oil into an air-tight oil-tank, a check valve in said passage, the said air-tight oil-tank, means of conducting oil from the said oil-tank to the desired points on the motor and means of relieving, gradually or precipitantly the pressure in the said oil-tank, substantially as and for the purpose set forth.

In testimony whereof I have affixed my signature to this specification in the presence of the two subscribing witnesses.

KIRK G. JOHNSTON.

Witnesses:
ELVA D. FOLLETT,
HELEN DENNISON.